(12) United States Patent
Simon

(10) Patent No.: US 11,222,534 B2
(45) Date of Patent: *Jan. 11, 2022

(54) SYSTEM AND METHOD FOR SMARTPHONE COMMUNICATION DURING VEHICLE MODE

(71) Applicant: Sfara Inc., Hoboken, NJ (US)

(72) Inventor: Sascha Simon, Warwick, NY (US)

(73) Assignee: Sfara, Inc., Hoboken, NJ (US)

( * ) Notice: Subject to any disclaimer, the term of this patent is extended or adjusted under 35 U.S.C. 154(b) by 524 days.

This patent is subject to a terminal disclaimer.

(21) Appl. No.: 16/114,393

(22) Filed: Aug. 28, 2018

(65) Prior Publication Data

US 2019/0005816 A1 Jan. 3, 2019

Related U.S. Application Data

(63) Continuation-in-part of application No. 14/136,467, filed on Dec. 20, 2013, now Pat. No. 10,062,285.

(51) Int. Cl.
| | |
|---|---|
| *G08G 1/0965* | (2006.01) |
| *H04W 4/48* | (2018.01) |
| *H04W 4/46* | (2018.01) |
| *H04W 4/02* | (2018.01) |

(Continued)

(52) U.S. Cl.
CPC ......... *G08G 1/0965* (2013.01); *G08G 1/163* (2013.01); *G08G 1/166* (2013.01); *G08G 1/167* (2013.01); *H04W 4/023* (2013.01); *H04W 4/46* (2018.02); *H04W 4/48* (2018.02); *G08G 1/096791* (2013.01); *H04W 4/026* (2013.01); *H04W 4/027* (2013.01)

(58) Field of Classification Search
CPC ...... G08G 1/0965; G08G 1/163; G08G 1/166; G08G 1/167; G08G 1/096791; H04W 4/46; H04W 4/48; H04W 4/023; H04W 4/026; H04W 4/027

See application file for complete search history.

(56) References Cited

U.S. PATENT DOCUMENTS

| | | | |
|---|---|---|---|
| 6,791,471 B2 * | 9/2004 | Wehner | G08G 1/163 340/903 |
| 8,099,232 B2 * | 1/2012 | Tanaka | B60T 7/22 701/117 |

(Continued)

*Primary Examiner* — Redhwan K Mawari
(74) *Attorney, Agent, or Firm* — Zeller IP Group, PLLC; Kyle M. Zeller

(57) ABSTRACT

A device is provided for use with a vehicle and with a communication device. The communication device can transmit a first vehicle mode signal and a subsequent signal. The device includes a processing component, an indicator component, a transmitting component and a receiving component. The processing component can operate in a vehicle mode and can operate in a second mode. The indicator component can provide a vehicle mode indication signal when the processing component is operating in the vehicle mode. The transmitting component can transmit a second vehicle mode signal based on the vehicle mode indication signal. The receiving component can receive the first vehicle mode signal and can receive the subsequent signal. The processing component can further perform a function while in the vehicle mode and based on the first vehicle mode signal and the subsequent signal.

9 Claims, 10 Drawing Sheets

(51) Int. Cl.
*G08G 1/16* (2006.01)
*G08G 1/0967* (2006.01)

(56) References Cited

U.S. PATENT DOCUMENTS

| | | | | |
|---|---|---|---|---|
| 8,793,036 | B2* | 7/2014 | Koon | G05D 1/0278 |
| | | | | 701/2 |
| 8,868,330 | B2* | 10/2014 | Park | G01C 21/20 |
| | | | | 701/408 |
| 9,329,048 | B2* | 5/2016 | Yakali | G07C 5/02 |
| 9,466,219 | B1* | 10/2016 | Stefani | G08G 5/0026 |
| 9,593,463 | B1* | 3/2017 | Hiranaka | E02F 9/261 |
| 9,598,009 | B2* | 3/2017 | Christensen | G08G 1/163 |
| 9,725,037 | B2* | 8/2017 | Goudy | G08G 1/097 |
| 9,776,630 | B2* | 10/2017 | Goudy | B60Q 9/008 |
| 9,842,501 | B2* | 12/2017 | Osagawa | G05D 1/0289 |
| 10,002,462 | B2* | 6/2018 | Seo | G08G 1/0967 |
| 10,019,012 | B2* | 7/2018 | Rylander | G05D 1/0223 |
| 10,037,698 | B2* | 7/2018 | Damiani | G08G 1/166 |
| 10,062,285 | B2* | 8/2018 | Simon | G08G 1/166 |
| 10,152,891 | B2* | 12/2018 | Rusciolelli | A01D 41/1278 |
| 10,248,128 | B2* | 4/2019 | Tanaka | G05D 1/0223 |
| 10,407,873 | B2* | 9/2019 | Ono | G08G 1/166 |
| 10,480,157 | B2* | 11/2019 | Friend | E02F 9/2054 |
| 10,551,848 | B2* | 2/2020 | Ogihara | G05D 1/0297 |
| 10,565,873 | B1* | 2/2020 | Christensen | G08G 1/0965 |
| 10,831,195 | B2* | 11/2020 | Ito | G05D 1/0297 |

* cited by examiner

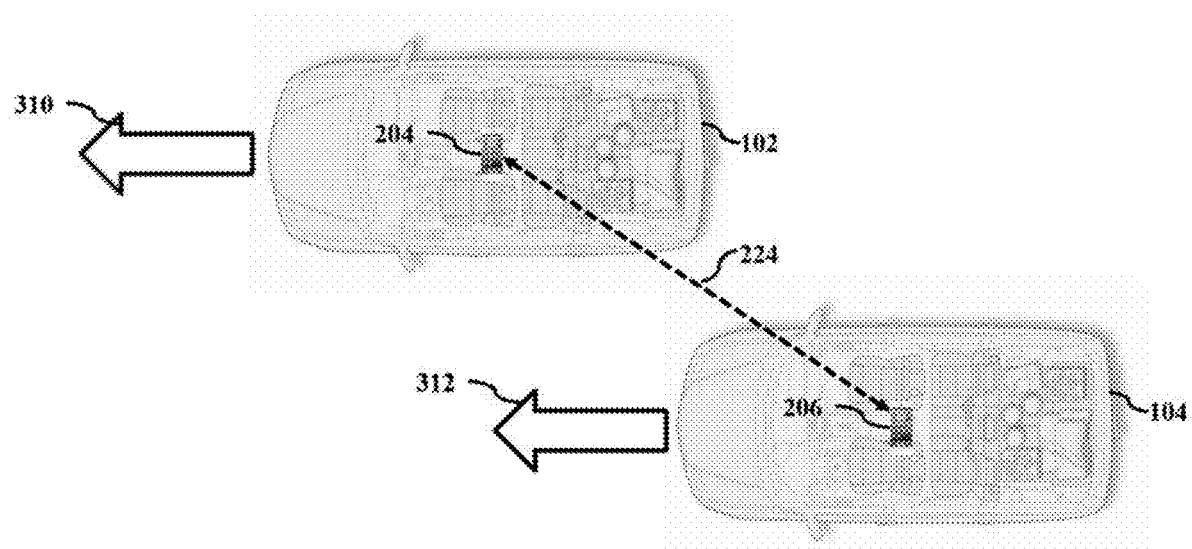

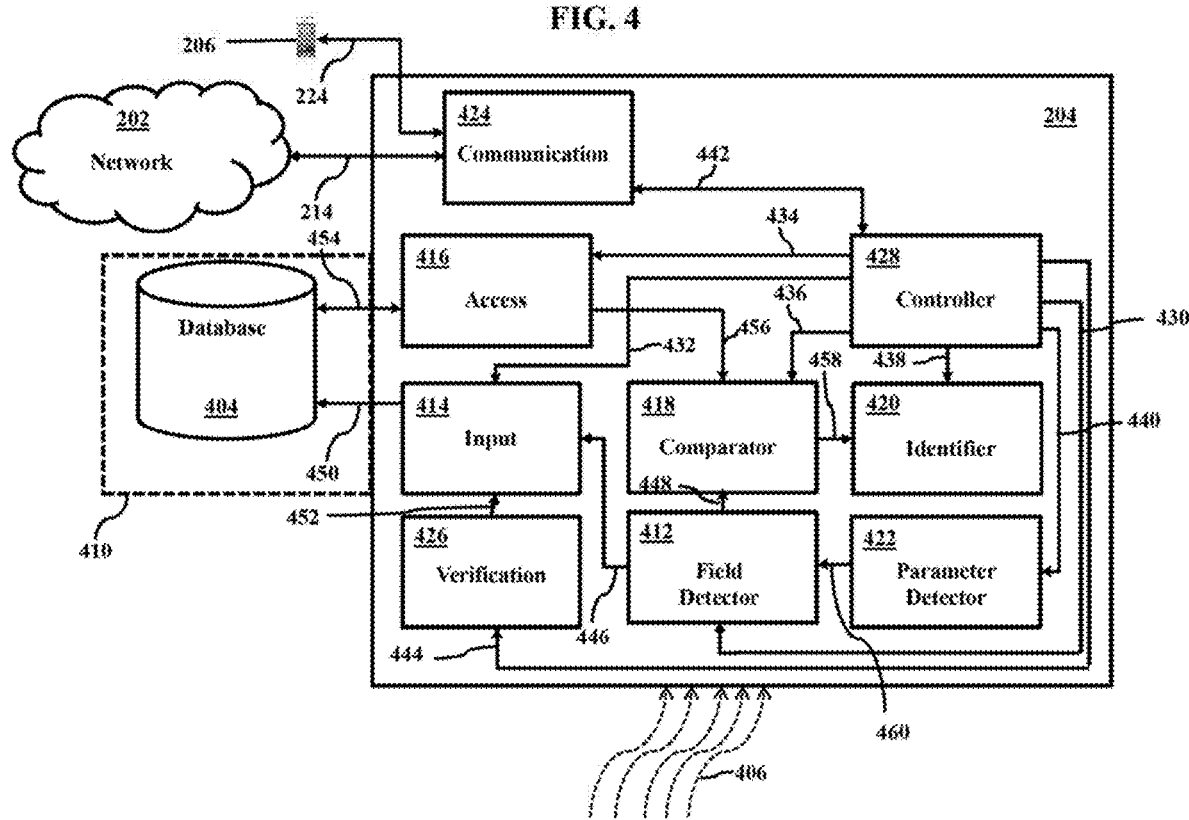

SYSTEM AND METHOD FOR SMARTPHONE COMMUNICATION DURING VEHICLE MODE

The present application is a continuation-in-part of U.S. application Ser. No. 14/136,467 filed Dec. 20, 2013, the entire disclosure of which is incorporated herein by reference.

BACKGROUND

Vehicle telematics is the technology of sending, receiving and storing information to and from vehicles and is generally present (at least to a limited extent) in the automotive marketplace today. For example, both General Motors (through their OnStar offering) and Mercedes Benz (through their Tele-Aid and more recent mbrace system offering) have long offered connected-vehicle functionality to their customers. Both of these offerings make use of the data available on a vehicle's CAN bus, which is specified in the OBD-II vehicle diagnostics standard. For example, the deployment of an airbag, which suggests that the vehicle has been involved in a crash, may be detected by monitoring the CAN bus. In this event, a digital wireless telephony module that is embedded in the vehicle and connected to the vehicle's audio system (i.e., having voice connectivity) can initiate a phone call to a telematics service provider (TSP) to "report" the crash. Vehicle location may also be provided to the TSP using the vehicle's GPS functionality. Once the call is established, the TSP representative may attempt to communicate with the vehicle driver, using the vehicle's audio system, to assess the severity of the situation. Assistance may thus be dispatched by the TSP representative to the vehicle as appropriate.

Historically, these services were focused entirely on driver and passenger safety. These types of services have expanded since their initial roll-out, however, and now offer additional features to the driver, such as concierge services. The services, however, remain mainly focused on voice based driver to call center communication, with data services being only slowly introduced, hindered by low bandwidth communication modules, high cost and only partial availability on some model lines.

As a result, while generally functional, vehicle telematics services have experienced only limited commercial acceptance in the marketplace. There are several reasons for this. In addition to low speeds and bandwidth, most vehicle drivers (perhaps excluding the premium automotive market niche) are reluctant to pay extra for vehicle telematics services, either in the form of an upfront payment (i.e., more expensive vehicle) or a recurring (monthly/yearly) service fee. Moreover, from the vehicle manufacturer's perspective, the services require additional hardware to be embedded into the vehicle, resulting in extra costs on the order of $250 to $350 or more per vehicle which cannot be recouped. Thus, manufacturers have been slow to fully commit to or invest in the provision of vehicle telematics equipment in all vehicles.

There have been rudimentary attempts in the past to determine when a smartphone is in a moving vehicle. Wireless service provider AT&T, Sprint and Verizon, for example, offer a smartphone application that reacts in a specific manner to incoming text messages and voice calls when a phone is in what AT&T calls DriveMode™. With the AT&T DriveMode application, a wireless telephone is considered to be in "drive mode" when one of two conditions are met. First, the smartphone operator can manually turn on the application, i.e. she "tells" the application to enter drive mode. Alternatively, when the DriveMode application is in automatic on/off mode and the smartphone GPS sensor senses that the smartphone is travelling at greater than 25 miles per hour, the GPS sensor so informs the DriveMode application, the DriveMode application concludes that the smartphone is in a moving vehicle, and drive mode is entered.

Both of these paths to engaging the AT&T DriveMode application—the "manual" approach to entering drive mode and the "automatic" approach to entering drive mode—are problematic. First, if the smartphone operator forgets or simply chooses not to launch the DriveMode application prior to driving the vehicle when the application is in manual mode then the application will not launch. Second, in automatic on/off mode AT&T's use of only the GPS sensor to determine when a smartphone is in a moving vehicle is problematic for a number of reasons. First, the speed threshold of the application is arbitrary, meaning that drive mode will not be detected/engaged at less than 25 mph. If the vehicle is stopped in traffic or at a traffic signal, for example, then the DriveMode application may inadvertently terminate. Second, and perhaps more importantly, AT&T's DriveMode application requires that the smartphone's GPS functionality be turned on at all times. Because the use of a smartphone's GPS sensor is extremely demanding to the battery resources of a smartphone, this requirement severely undermines the usefulness of AT&T's application. Thirdly this method does not differentiate between the type of vehicle that the phone is in, e.g. a bus, a taxi or a train and therefore allows no correlation between the owner of the phone and her driving situation. For the classic embedded telematics devices to be replaces by smartphones it is important to correlate the driver and smartphone owner with her specific location within a vehicle. Only then the smartphone can truly take the functional role of an embedded telematics device in a vehicle.

There currently is no system for smartphones within two separate vehicles to automatically communicate with one another. It would be beneficial if a smartphone could determine aspects of the vehicle within which it is disposed and communicate these aspects to smartphones in nearby vehicles to reduce the likelihood of vehicular collisions. Such a technology is today not commercially available.

SUMMARY

The present invention provides an improved method and apparatus for determining aspects of a vehicle within which it is disposed and for communicating these aspects to smartphones in nearby vehicles to reduce the likelihood of vehicular collisions.

Various embodiments described herein are drawn to device for use with a vehicle and with a communication device. The communication device can transmit a first vehicle mode signal and a subsequent signal. The device includes a processing component, an indicator component, a transmitting component and a receiving component. The processing component can operate in a vehicle mode and can operate in a second mode. The indicator component can provide a vehicle mode indication signal when the processing component is operating in the vehicle mode. The transmitting component can transmit a second vehicle mode signal based on the vehicle mode indication signal. The receiving component can receive the first vehicle mode signal and can receive the subsequent signal. The processing component can further perform a function while in the vehicle mode and based on the first vehicle mode signal and the subsequent signal.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIGS. 3A-C illustrate two vehicles travelling at times $t_3$, $t_4$ and $t_5$, respectively, and avoiding a crash in accordance with aspects of the present invention;

FIG. 4 illustrates an example communication device in accordance with aspects of the present invention;

DETAILED DESCRIPTION

Aspects of the present invention are drawn to a system and method for communicating between two smartphones.

As used herein, the term "smartphone" includes cellular and/or satellite radiotelephone(s) with or without a display (text/graphical) Personal Communications System (PCS) terminal(s) that may combine a radiotelephone with data processing, facsimile and or data communications capabilities; Personal Digital Assistant(s) (PDA) or other devices that can include a radio frequency transceiver and a pager, Internet/Intranet access, Web browser, organizer, calendar and/or a global positioning system (GPS) receiver; and/or conventional laptop (notebook) and/or palmtop (netbook) computer(s), tablet(s), or other appliance(s), which include a radio frequency transceiver. As used herein, the term "smartphone" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more location(s).

In an example embodiment, a first smartphone is disposed in a first vehicle and a second smartphone is disposed in a second vehicle. The first smartphone and second smartphone are able to inform one another that they are each in a vehicle. The first smartphone is additionally able to inform the second smartphone of the speed and direction of the vehicle in which the first smartphone is disposed. In the event that the speed and direction of the vehicle in which the first smartphone is disposed may signify a probable collision with the vehicle in which the second smartphone is disposed, the second smartphone may provide a warning to the driver of the second vehicle.

Aspects of the present invention include a smartphone being able to identify whether it is in a vehicle based on a detection of a magnetic signal and additional parameters associated with the vehicle.

Aspects of the present invention include a smartphone being able to associate a particular function to be performed when it receives information from another smartphone. In some specific embodiments, the particular function is based on whether the smartphone is disposed within a vehicle. As such, the number of possible functions to be performed is limited to those associated with being in a vehicle. Alternatively, if the smartphone is not disposed in a vehicle, than the number of possible functions to be performed is limited to those possible functions that are not associated with the smartphone being in a vehicle.

Figure 1A:
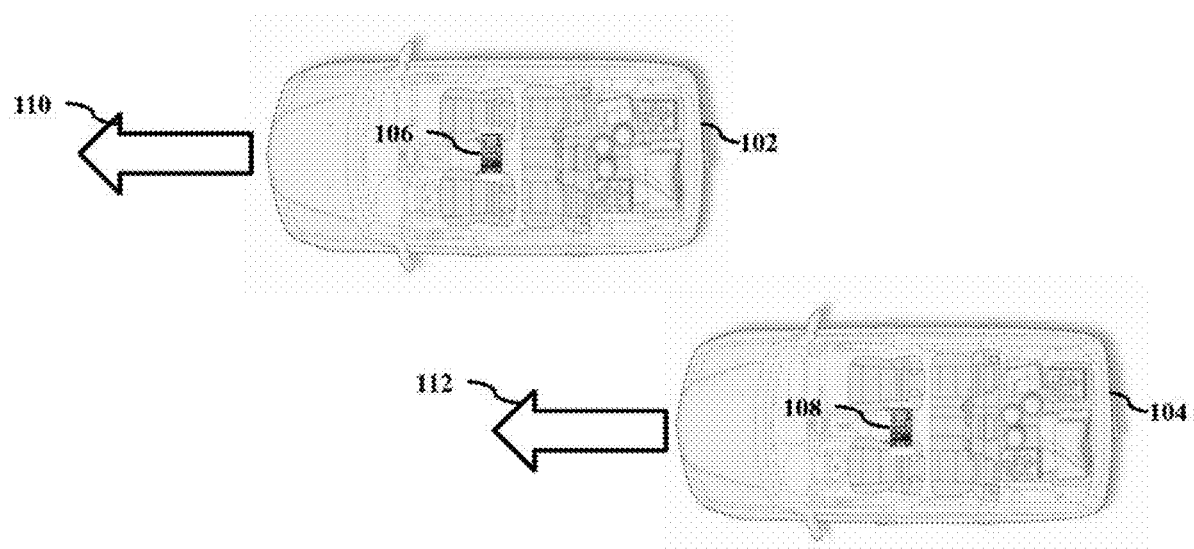
FIGS. 1A-C illustrate two vehicles travelling at times $t_0$, $t_1$ and $t_2$, respectively, and ultimately crashing.
Figure 1B:
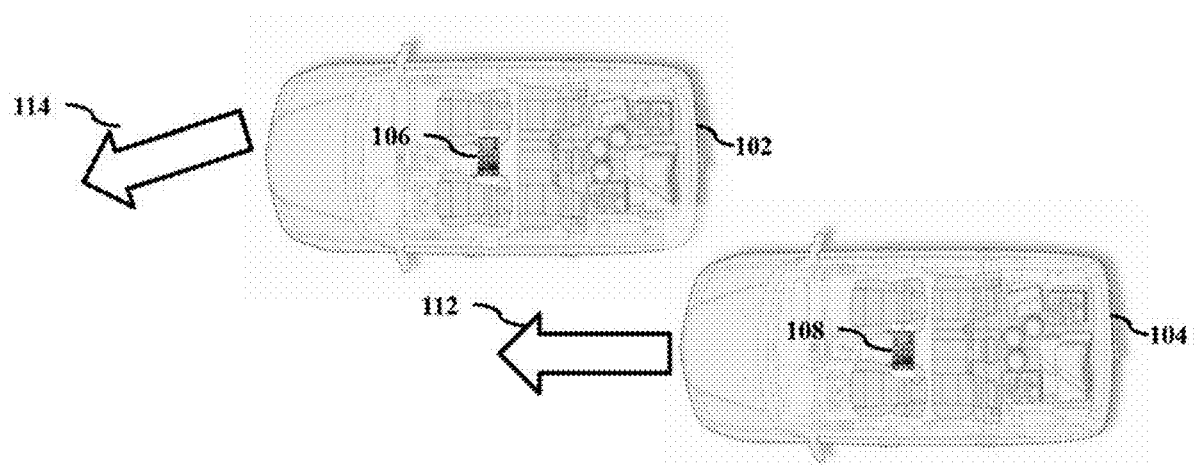
Figure 1C:
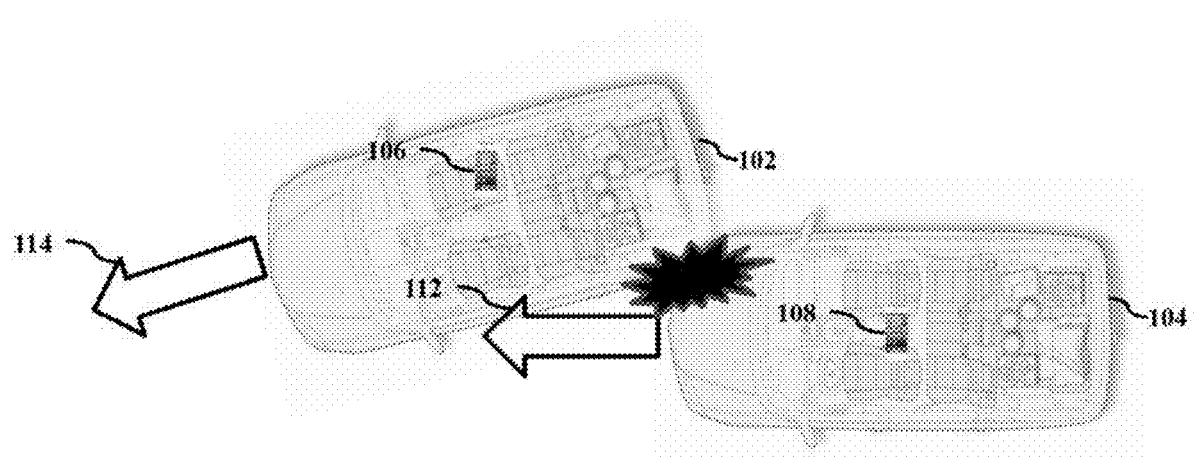

FIGS. 1A-C illustrate two vehicles travelling at times $t_0$, $t_1$ and $t_2$, respectively, and ultimately crashing.

FIG. 1A includes a vehicle 102 and a vehicle 104 at a time $t_0$. Vehicle 102 has a communication device 106 therein, and is traveling in a direction indicated by arrow 110. Vehicle 104 has a communication device 108 therein, and is traveling in a direction indicated by arrow 112. For purposes of discussion throughout, a smartphone is an example of a communication device.

At time $t_1$, the driver of vehicle 102 changes direction without seeing vehicle 104. This is shown in FIG. 1B. In particular, at time $t_1$, vehicle 102 is traveling in the direction indicated by arrow 114.

At time $t_2$, the driver of vehicle 102 continues to travel in the direction indicated by arrow 114 without seeing vehicle 104. This is shown in FIG. 1C, wherein vehicle 102 crashes with vehicle 104.

In accordance with aspects of the present invention, the situation discussed above with reference to FIGS. 1A-C may be avoided through use of nonverbal communications between two or more smartphones. This and other aspect of the present invention will be further described with reference to FIG. 2-6.

Figure 2:
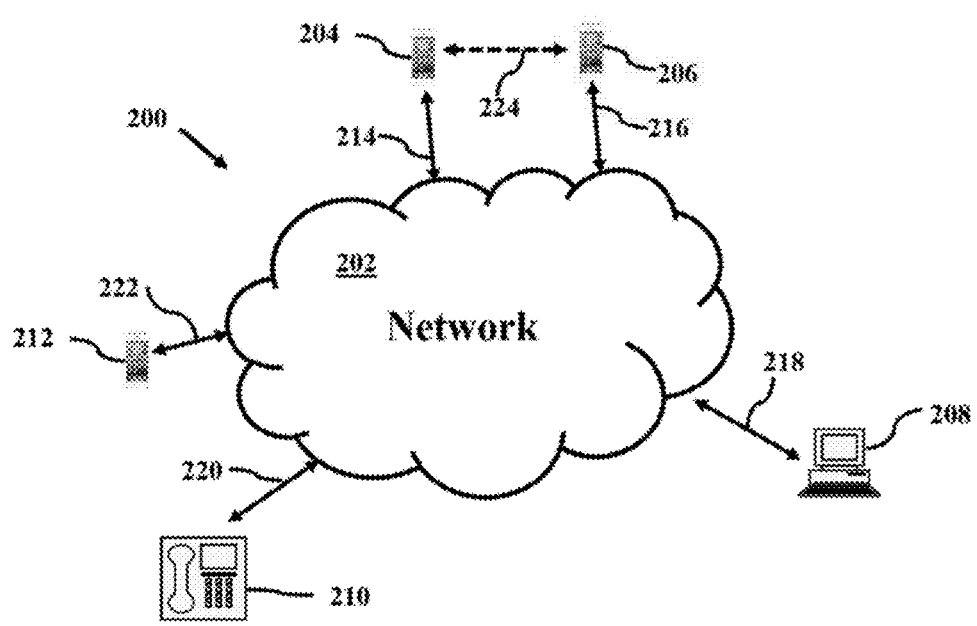
FIG. 2 illustrates a communication system.

FIG. 2 illustrates a communication system 200.

As shown in the figure, communication system 200 includes a network 202, a communication device 204 in accordance with aspects of the present invention, a communication device 206 in accordance with aspects of the present invention, a plurality of computers—a sample of which is indicated as computer 208, a plurality of land-line telephones—a sample of which is indicated as land-line telephone 210 and a plurality of communication devices—a sample of which is indicated as communication device 212.

Network 202 may include enterprise wide area networks (WANs), local area networks (LANs), satellite communication networks, public switched telephone networks, cellular communication networks, the Internet itself and combinations thereof. Communication device 206 is able to send/receive information to/from network 202 via a communication channel 214. Communication device 206 is able to send/receive information to/from network 202 via a communication channel 216. Computer 208 is able to send/receive information to/from network 202 via a communication channel 218. Land-line telephone 210 is able to send/receive information to/from network 202 via a communication channel 220. Communication device 212 is able to send/receive information to/from network 202 via a communication channel 222. In accordance with aspects of the present invention, communication device 206 is additionally operable to send/receive information to/from communication device 206 via a communication channel 224.

Each and every one of communication device 204, communication device 206, computer 208, land-line telephone 210 and communication device 212 is able to communicate with one another by way of network 202.

Communication channels 214, 216, 218, 220 and 222 may be any known wired or wireless communication channels. Communication channel 224 may be any known wireless communication channel.

An example implementation of an aspect in accordance with the present invention, by way of communication device 204 and communication device 206, may automatically facilitate crash avoidance. This will now be further described with reference to FIGS. 3A-C.

Figure 3B:
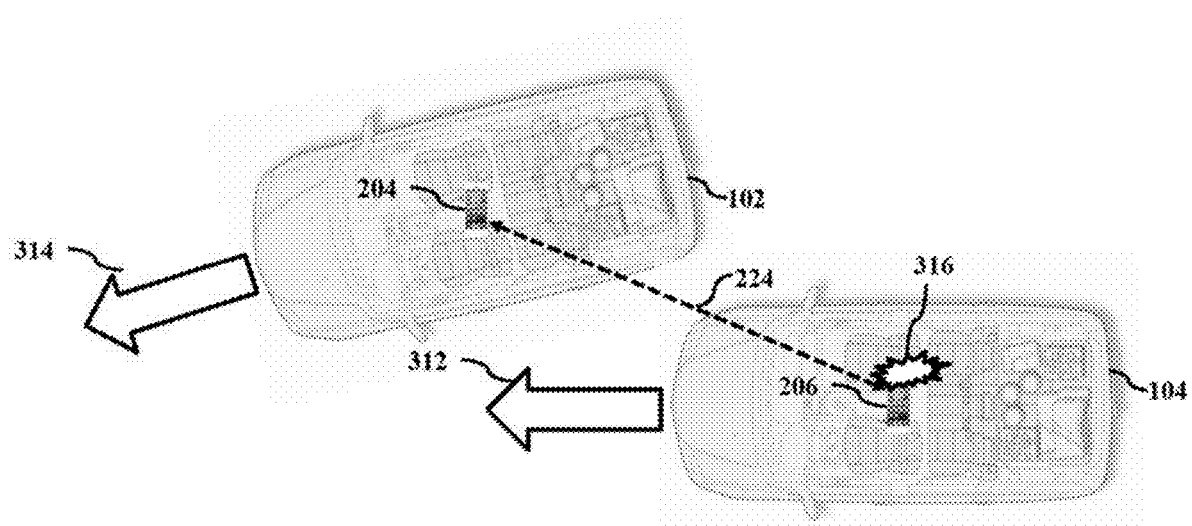
Figure 3C:
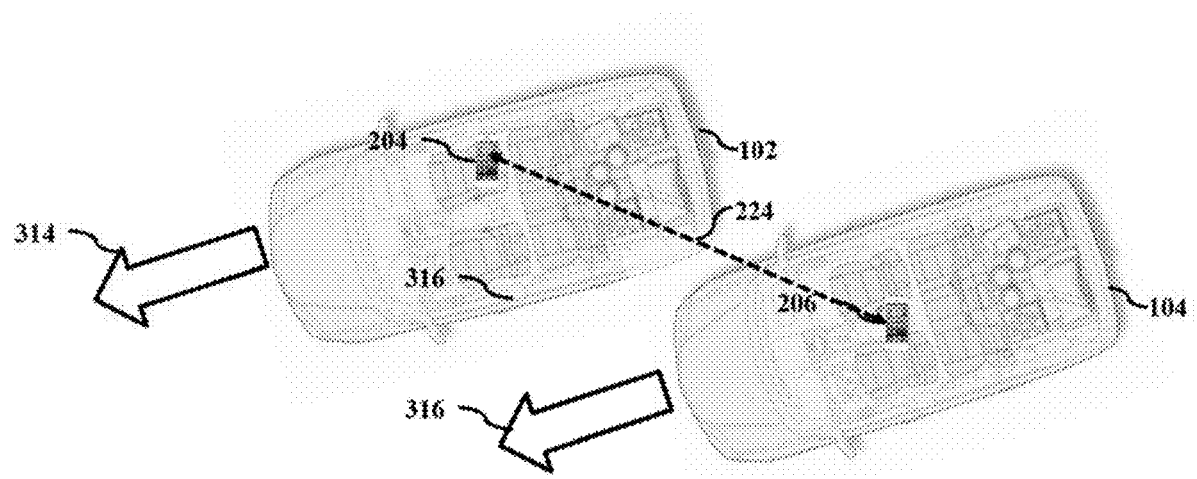

FIGS. 3A-C illustrate two vehicles travelling at times $t_3$, $t_4$ and $t_5$, respectively, and ultimately avoiding a crash in accordance with aspects of the present invention.

FIG. 3A includes vehicle 102 and vehicle 104 at a time $t_3$. Vehicle 102 has communication device 204 therein, and is traveling in a direction indicated by arrow 310. Vehicle 104 has a communication device 206 therein, and is traveling in a direction indicated by arrow 312. Here, communication device 204 is in communication with communication device 206 via communication channel 224. In some example embodiments, communication device 204 and communication device 206 are exchanging information related to each other's respective location and velocity. In other example embodiments, devices 204 and 206 may exchange information with their respective vehicles 102 and 104, or with other vehicles or receivers (not shown).

At time $t_4$, the driver of vehicle 102 changes direction without seeing vehicle 104. This is shown in FIG. 3B, In particular, at time $t_4$, vehicle 102 is traveling in the direction indicated by arrow 314. Here, again, communication device 204 is in communication with communication device 206 via communication channel 224. Again in this example, communication device 204 and communication device 206 are exchanging information related to each other's respective location and velocity. Further, communication device 206 provides an alert, as shown in the figure as item 316, to alert driver of vehicle 104 that if vehicle 102 proceeds along direction 314 is likely to collide with vehicle 104. Communication device 206 may also or instead communicate with its vehicle 104 or another vehicle or receiver, of the likelihood of collision. Vehicle 104 may then take action autonomously, if it is so enabled, such as communicating with vehicle 102 or another receiver or device.

As shown in FIG. 3C, at time $t_5$, the driver of vehicle 104 changes direction as indicated by arrow 316 irrespective of whether the driver of vehicle 102 has seen vehicle 104. As such, the driver of vehicle 104 avoids crashing into vehicle 102.

In the example embodiments discussed above with reference to FIGS. 3A-C, communication device 204 is operable to wirelessly communicate with communication device 206. However, this is a non-limiting example for purposes of discussion. It should be noted that a plurality of communication devices may be able to communicate with one another. Further, in the example discussed above with reference to FIGS. 3A-C, communication device 206 is operable to provide a warning to the driver of vehicle 104. However, in accordance with aspects of the present invention, communication device 204 may similarly provide a warning to the driver of vehicle 102 based on information provided by communication device 206, which was expressly not discussed for the purposes of brevity. Likewise, communication device 204 and/or communication device 206 may each communication with their respective vehicles 102 and 104 or with other vehicles or receivers (not shown). If the vehicles are so enabled, the vehicles may then autonomously make actions in response to the warning, such as evasive action, braking action, communications, or the like.

More specifically, in accordance with embodiments of the invention is the ability of two or more devices, such as communication devices 204 and 206, to work in coordination to provide road, traffic, and/or other information to an autonomous or partially autonomous vehicle, such as vehicle 102 and/or 104, that has been gathered by devices in those or other vehicles. For example, let us assume that a device in a vehicle A has detected slowed down traffic and that a vehicle B is travelling autonomously and is approaching vehicle A from behind. According to embodiments of the present invention, a device in vehicle B may receive the detected information from the device in vehicle A about the slowed traffic ahead and further may share this information with the autonomous vehicle B via an established form of communication like a Bluetooth, Wifi, or wired connection. The autonomous vehicle B may then be able to initiate a slowdown or other responsive action before vehicle A is in the signal of view of vehicle B's sensors. Similar examples can be constructed for a variety of other situations in which a sensing of hazardous or otherwise noteworthy road conditions by devices and the sharing of such conditions to other devices outside the immediate signal of view and sensor range can greatly enhance traffic safety and dramatically augment vehicle sensors and share information between vehicles that may or may not be autonomous. This plays a particularly important role as long as non-autonomous, partially autonomous, and fully autonomous vehicles are sharing roads and as long as a ubiquitous standard communication between all vehicles on the road is not in existence. The device acts here as the unifying true ubiquitous means of communications between all vehicles on the road.

The implementation of an aspect of the present invention discussed above with reference to FIGS. 3A-C is a non-limiting example implementation. In general, an aspect of the present invention enables to communication devices to wirelessly communicate with one another wherein at least one of the communication devices then automatically provides a function based on the wireless communication with the other communication device.

A more detailed discussion of an example communication device and method in accordance with aspects of the present invention will now be described with reference to FIGS. 4-6.

FIG. 4 illustrates an example communication device 204 in accordance with aspects of the present invention.

FIG. 4 includes a device 206, a database 404, a signal 406 and a network 408. In this example embodiment, device 206 and database 404 are distinct elements. However, in some embodiments, device 206 and database 404 may be a unitary device as indicated by dotted line 410.

Device 206 includes a signal-detecting component 412, an input component 414, an accessing component 416, a comparing component 418, an identifying component 420, a parameter-detecting component 422, a communication component 424, a verification component 426 and a controlling component 428.

In this example, signal-detecting component 412, input component 414, accessing component 416, comparing component 418, identifying component 420, parameter-detecting component 422, communication component 424, verification component 426 and controlling component 428 are illustrated as individual devices. However, in some embodiments, at least two of signal-detecting component 412, input component 414, accessing component 416, comparing component 418, identifying component 420, parameter-detecting component 422, communication component 424, verification component 426 and controlling component 428 may be combined as a unitary device. Further, in some embodiments, at least one of signal-detecting component 412, input component 414, accessing component 416, comparing component 418, identifying component 420, parameter-detecting component 422, communication component 424, verification component 426 and controlling component 428 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any, other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Controlling component 428 is arranged to communicate with: signal-detecting component 412 via a communication line 430; input component 414 via a communication line 432; accessing component 416 via a communication line 434; comparing component 418 via a communication line 436; identifying component 420 via a communication line 438; parameter-detecting component 422 via a communication line 440; communication component 424 via a communication line 442; and verification component 426 via a communication line 444. Controlling component 428 is operable to control each of signal-detecting component 412, input component 414, accessing component 416, comparing component 418, identifying component 420, parameter-detecting component 422, communication component 424 and verification component 426.

Signal-detecting component 412 is additionally arranged to detect signal 406, to communicate with input component 414 via a communication line 446, to communicate with comparing component 418 via a communication line 448 and to communicate with parameter-detecting component 422 via a communication line 460. Signal-detecting component 412 may be any known device or system that is operable to detect a signal, non-limiting examples of which include an electric signal, a magnetic signal, and electromagnetic signal and combinations thereof. In some non-limiting example embodiments, signal-detecting component 412 may detect the amplitude of a field or signal at an instant of time. In some non-limiting example embodiments, signal-detecting component 412 may detect a signal or field vector at an instant of time. In some non-limiting example embodiments, signal-detecting component 412 may detect the amplitude of a signal or signal as a function over a period of time. In some non-limiting example embodiments, signal-detecting component 412 may detect a signal or field vector as a function over a period of time. In some non-limiting example embodiments, signal-detecting component 412 may detect a change in the amplitude of a signal or signal as a function over a period of time. In some non-limiting example embodiments, signal-detecting component 412 may detect a change in a signal or field vector as a function over a period of time. Signal-detecting component 412 may output a signal based on the detected signal or field.

Input component 414 is additionally arranged to communicate with database 404 via a communication line 450 and to communicate with verification component 426 via a communication line 452. Input component 414 may be any known device or system that is operable to input data into database 404. Non-limiting examples of input component 414 include a graphic user interface (GUI) having a user interactive touch screen or keypad.

Accessing component 416 is additionally arranged to communicate with database 404 via a communication line 454 and to communicate with comparing component 418 via a communication line 456. Accessing component 416 may be any known device or system that access data from database 404.

Comparing component 418 is additionally arranged to communicate with identifying component 420 via a communication line 458. Comparing component 418 may be any known device or system that is operable to compare two inputs.

Parameter-detecting component 422 is additionally arranged to communicate with identifying component 422 via a communication line 460. Parameter-detecting component 422 may be any known device or system that is operable to detect a parameter, non-limiting examples of which include velocity, acceleration, angular velocity, angular acceleration, geodetic position, light, sound, temperature, vibrations, pressure, biometrics, contents of surrounding atmosphere and combinations thereof. In some non-limiting example embodiments, parameter-detecting component 422 may detect the amplitude of a parameter at an instant of time. In some non-limiting example embodiments, parameter-detecting component 422 may detect a parameter vector at an instant of time. In some non-limiting example embodiments, parameter-detecting component 422 may detect the amplitude of a parameter as a function over a period of time. In some non-limiting example embodiments, parameter-detecting component 422 may detect a parameter vector as a function over a period of time. In some non-limiting example embodiments, parameter-detecting component 422 may detect a change in the amplitude of a parameter as a function over a period of time. In some non-limiting example embodiments, parameter-detecting component 422 may detect a change in a parameter vector as a function over a period of time.

Communication component 424 is additionally arranged to communicate with network 408 via a communication line 214. Communication component 424 may be any known device or system that is operable to communicate with network 408. Nona limiting examples of communication component include a wired and a wireless transmitter/receiver.

Verification component 426 may be any known device or system that is operable to provide a request for verification. Non-limiting examples of verification component 426 include a graphic user interface having a user interactive touch screen or keypad.

Communication lines 430, 432, 434, 436, 438, 440, 442, 444, 446, 448, 450, 452, 454, 456, 458, 460 and 214 may be any known wired or wireless communication line.

Database 404 may be any known device or system that is operable to receive, store, organize and provide (upon a request) data, wherein the "database" refers to the data itself and supporting data structures. Non-limiting examples of database 404 include a memory hard-drive and a semiconductor memory.

Network 408 may be any known linkage of two or more communication devices. Non-limiting examples of database 408 include a wide-area network, a local-area network and the Internet.

Figure 5:
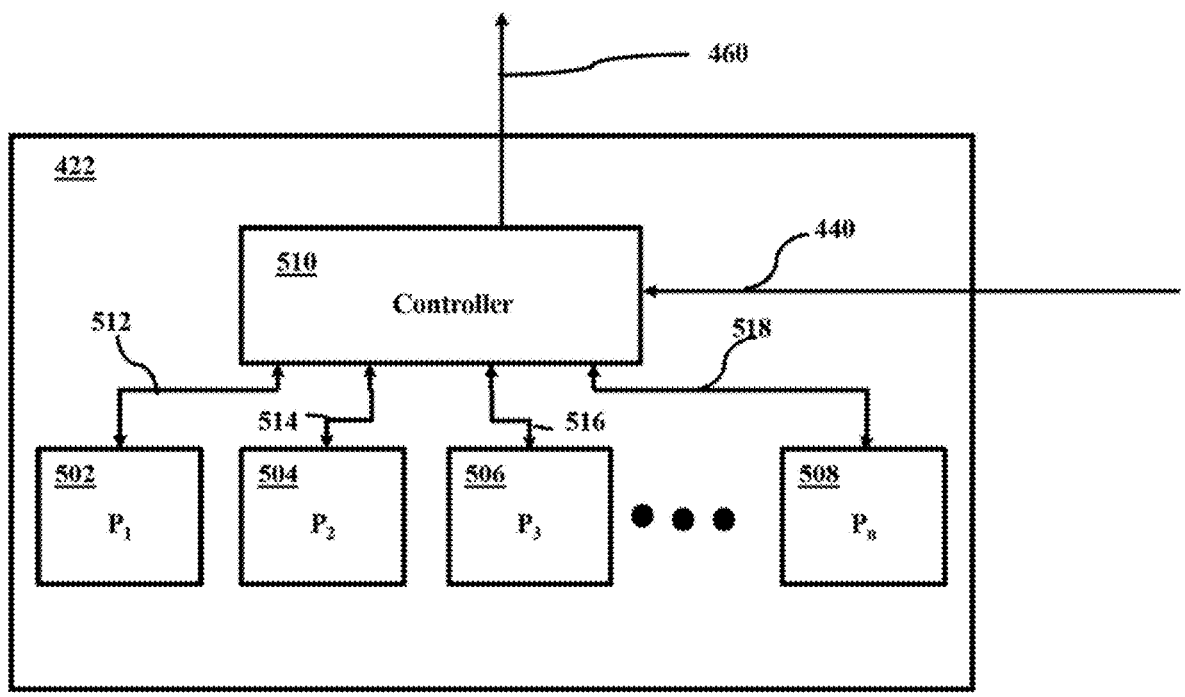
FIG. 5 illustrates an example parameter-detecting component in accordance with aspects of the present invention.

FIG. 5 illustrates an example parameter-detecting component 422.

As shown in the figure, parameter-detecting component 422 includes a plurality of detecting components, a sample of which are indicated as a first detecting component 502, a second detecting component 504, a third detecting component 506 and an n-th detecting component 508. Parameter-detecting component 422 additionally includes a controlling component 510.

In this example, detecting component 502, detecting component 504, detecting component 506, detecting component 508 and controlling component 510 are illustrated as individual devices. However, in some embodiments, at least two of detecting component 502, detecting component 504, detecting component 506, detecting component 508 and controlling component 510 may be combined as a unitary device. Further, in some embodiments, at least one of detecting component 502, detecting component 504, detecting component 506, detecting component 508 and controlling component 510 may be implemented as a computer having tangible computer-readable media for carrying or having computer-executable instructions or data structures stored thereon.

Controlling component 510 is configured to communicate with: detecting component 502 via a communication line 512; detecting component 504 via a communication line 514; detecting component 506 via a communication line 516; and detecting component 508 via a communication line 518. Controlling component 510 is operable to control each of detecting component 502, detecting component 504, detecting component 506 and detecting component 508. Controlling component 510 is additionally configured to communicate with controlling component 428 of FIG. 4 via communication line 440 and to communicate with signal-detecting component 412 of FIG. 4 via communication line 460.

The detecting components may each be a known detecting component that is able to detect a known parameter. For example each detecting component may be a known type of detector that is able to detect at least one of magnetic signals in any of three dimensions, electric signals in any of three dimensions, electro-magnetic signals in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric signals in any of three dimensions, a change in magnetic signals in any of three dimensions, a change in electro-magnetic signals in any of three dimensions, a change in velocity in an of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof. For purposes of discussion, let: detecting component 502 be able to detect deceleration in three dimensions; detecting component 504 be able to detect sound; detecting component 506 be able to detect vibrations and detecting component 508 be able to detect geodetic position.

In some non-limiting example embodiments, at least one of the detecting components of parameter-detecting component 422 may detect a respective parameter as an amplitude at an instant of time. In some non-limiting example embodiments, at least one of the detecting components of parameter-detecting component 422 may detect a respective parameter as a function over a period of time.

Each of the detecting components of parameter-detecting component 422 is able to generate a respective detected signal based on the detected parameter. Each of these detected signals may be provided to controlling component 510 via a respective communication line.

Controlling component 510 is able to be controlled by controlling component 428 via communication line 440.

Figure 6:
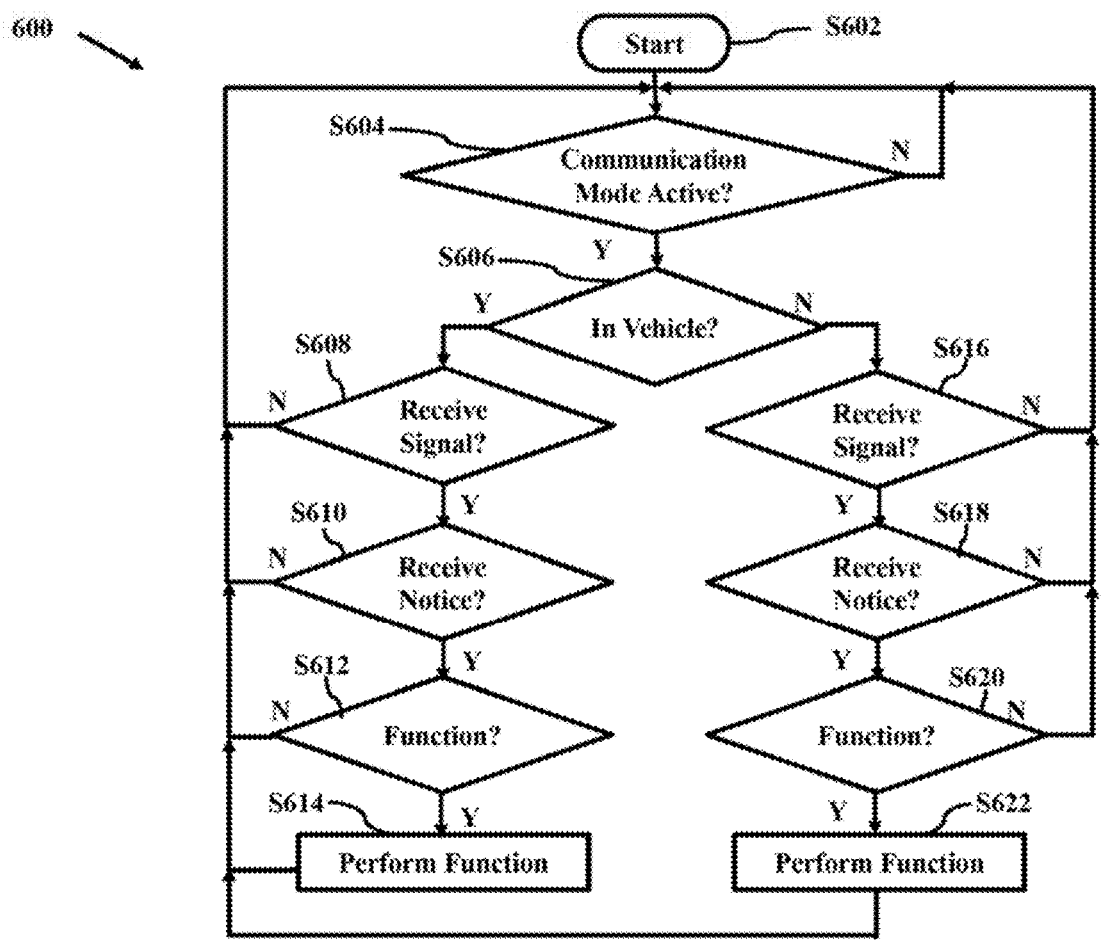
FIG. 6 illustrates an example method of communicating between two communication devices in accordance with aspects of the present invention.

FIG. 6 illustrates an example method 600 of communicating between two communication devices in accordance with aspects of the present invention. For purposes of discussion, method 600 will be described with reference to the situation discussed above in FIGS. 3A-C.

As shown in the figure, method 600 starts (S602) and it is determined whether the communication mode of the communication device is active (S604). If a smartphone is not currently functioning in a communication mode that allows wireless communication with other nearby smartphones, then the remainder of method 600 may not occur (N at S604). Otherwise, method 600 continues (Y at S604). In some embodiment, a smartphone may not be currently functioning in a communication mode that allows wireless communication with other nearby smartphones as a result of the user actively disabling such functioning. In some embodiments, a smartphone may function in a communication mode that allows wireless communication with other nearby smartphones as a result of the user actively enabling such functioning. In some embodiments, a smartphone may function in a communication mode that allows wireless communication with other nearby smartphones by default when the smartphone is powered.

For example, returning to FIG. 4, communication device 206 may be operable to communicate with network 202 in a first mode and may be operable to communicate with communication device 204 via communication channel 224 in a second mode. For purposes of discussion, let the first mode be a cellular communication mode wherein communication device 206 is able to communicate with network 202 such that communication channel 214 is a cellular communication channel. Further, let the second mode be a wireless communication mode, non-limiting, examples of which include Wi-Fi and Bluetooth, wherein communication device 206 is able to communicate with communication device 204. In this manner, communication channel 224 might have less bandwidth restrictions and less power requirements for communication as compared with the first mode communicating over communication channel 214.

As discussed above, communication devices 204 and 206 may additionally or alternatively communicate with their respective vehicles 102 and 104, or with other vehicles or receivers (not shown), as will be understood by those of skill in the art.

In some example embodiments, controlling component 428 is able to instruct medication portion 424, by way of communication line 442, to operate in the first mode or the second mode. For example, a user by way of the GUI of input component 414, may enable controlling component 428 to instruct communication portion to operate in the second mode. In some example embodiments, communication device 206 may operate in the second mode of communication by default.

In any event, in some example embodiments, controlling component 428 is operable to determine whether communication component 424 is operating in the second communication mode, such that communication device 206 may wirelessly communicate with communication device 204.

Returning to FIG. 6, if it is determined that communication device 206 does not have the second communication mode active (N at S604), then it continues to check for activation of the second communication mode (S604). For example, let communication device 206 not be operating in the second communication mode. Therefore, communication device 206 would not be able to receive communications from communication device 204 via communication channel 224.

If it is determined that communication device 206 has the second communication mode active (Y at S604), it is then determined whether the communication device is in a vehicle (S606). In accordance with this aspect of the present invention, a smartphone is able to automatically determine whether it is disposed within a vehicle. This determination enables more efficient processing for the remainder of method 600, as will be described in more detail below, because further determinations will be divided between in-vehicle situations (S608, S610, S612 and S614) and non-in-vehicle situations (S616, S618, S620 and S622).

For example, returning to FIG. 4, let communication device 206 be operating in the second communication mode, wherein communicates with communication device 204 via communication channel 224. At this point, communication device 206 may determine that it is in vehicle 102 by any known method. In some embodiments, communication device 206 may determine that it is in vehicle 102 by: 1) detecting a signal; 2) detecting at least one other parameter; 3) generating a signature based on the detected signal and the detected at least one other parameter; and 4) comparing the generated signature with previously stored signatures associated with the vehicle. Examples of embodiments where communication device 206 may determine that it is in vehicle 102 are described in greater detail as disclosed in co-pending U.S. patent application Ser. No. 14/072,231 filed Nov. 5, 2013. In some embodiments, communication device 206 may determine that it is in vehicle 102 in a manner disclosed in co-pending U.S. patent application Ser. No. 14/095,156 filed Dec. 3, 2013. In some embodiments, communication device 206 may determine that it is in vehicle 102 in a manner disclosed in U.S. application Ser. No. 14/105,744 filed Dec. 13, 2013. In some embodiments, communication device 206 may determine that it is in vehicle 102 in a manner disclosed in U.S. application Ser. No. 14/105,934 filed Dec. 13, 2013.

Returning to FIG. 6, if it is determined that communication device 206 is in a vehicle (Y at S606), then it is determined whether a vehicle mode signal is received (S608). A vehicle mode signal is a signal from a communication device indicating that it is in a vehicle and is communicating through the wireless channel to other communication devices. If the smartphone is does not receive a vehicle mode signal from another communication device, then the remainder of method 600 may not occur (N at S608). Otherwise, method 600 continues (Y at S608). In some embodiment, although a smartphone may be enabled and ready to communicate with other communication devices there may be situations where there are no communication devices nearby that are ready or able to provide vehicle mode signals. In such situations, the smartphone would essentially wait to receive vehicle mode signals.

For example, returning to FIG. 3A, for purposes of discussion, let communication device 204 be able to operate in a second communication mode, wherein communication device 204 may transmit a signal along communication channel 224 to communication device 206. To simplify the discussion, let the second communication mode be a vehicle mode, indicating that communication device 204 is in a vehicle.

If it is determined that a vehicle mode signal is not received (N at S608), then it continues to check for activation of the second communication mode (S604). For example, returning to FIG. 4, in the event that communication device 204 is not transmitting a signal indicating that it is operating in a vehicle mode or communication device 206 is out of range of receiving such a communication, then communication component 424 will not receive such a signal. This situation may occur when no other communication devices are within range of a receiving communication device.

Returning to FIG. 6, if it is determined that a vehicle mode signal is received (Y at S608), then it is determined whether a subsequent notice signal is received (S610). A subsequent notice signal is a signal received after the vehicle mode signal and that provides further information related to the communication device providing the subsequent notice signal. If the smartphone does not receive a subsequent notice signal from another communication device, then the remainder of method 600 may not occur (N at S610). Otherwise, method 600 continues (Y at S610). In some embodiment, although a smartphone may enabled and ready to communicate with other communication devices, and may have received vehicle mode signals from at least one other nearby communication device, there may be situations where there are no communication devices nearby that are ready or able to provide vehicle subsequent notice signals. In such situations, the smartphone would essentially wait to receive subsequent notice signals.

For example, returning to FIG. 4, in the event that communication device 204 is transmitting a signal indicating that it is operating in a vehicle mode and communication device 206 is within range of receiving such a communication, then communication component 424 will may receive the signal from communication device 206.

Returning to FIG. 3A, in an example implementation, communication device 204 transmits a vehicle mode signal by way of communication channel 224 to communication device 206 (and additionally or alternatively vehicle 102, or another vehicle or receiver). In this manner, communication device 206 is aware that communication device 204 is in a vehicle mode and communication device 206 awaits a subsequent signal from communication device 204.

A subsequent signal from communication device 204 may be a notice signal having information therein. Non-limiting examples of types of information in the notice signal include: geodetic location of the vehicle in which the communication device that is sending the notice signal is disposed; velocity of the vehicle in which the communication device that is sending the notice signal is disposed; acceleration of the vehicle in which the communication device that is sending the notice signal is disposed; a change in geodetic location of the vehicle in which the communication device that is sending the notice signal is disposed; a change in velocity of the vehicle in which the communication device that is sending the notice signal is disposed; a change in acceleration of the vehicle in which the communication device that is sending the notice signal is disposed; identification, e.g., make mode, year, of the vehicle in which the communication device that is sending the notice signal is disposed; relay of information from another vehicle in which another communication device that is sending the original notice signal is disposed; destination information of the vehicle in which the communication device that is sending the notice signal is disposed; social networking information of the owner of the communication device within the vehicle in which the communication device that is sending the notice signal is disposed; and combinations thereof.

Returning to FIG. 6, if it is determined that a subsequent notice signal is not received (N at S610), then it continues to check for activation of the second communication mode (S604). For example, returning to FIG. 4, in the event that communication device 204 does not transmit a subsequent notice signal or communication device 206 is out of range of receiving such a signal, then communication component 424 will not receive such a signal.

Returning to FIG. 6, if a subsequent notice signal is received (Y at S610), then it is determined whether a function is required (S612). At this point in method 600, a smartphone will have autonomously received information from a nearby smartphone wherein the information relates to aspects of the nearby smartphone. In some situations the information relating to aspects of the nearby smartphone may affect or be important to the user (and by extension or directly the vehicle of the user in which the smartphone is currently disposed). Therefore, the smartphone may be able to autonomously perform a function based on the received information that relates to aspects of the nearby smartphone. If the smartphone is does not need to perform a function based on the received information that relates to aspects of the nearby smartphone, then the remainder of method 600 may not occur (N at S612). Otherwise, the function is performed (Y at S612).

For example, returning to FIG. 4, in the event that communication device 204 is transmitting a notice signal and communication device 206 or vehicles 102, 104, or the like are within range of receiving such a signal, then communication component 424 may receive the notice signal. Controlling component 428 may then determine whether a function is required.

In some example embodiments, database 404 may store associations between information of notice signals and functions. Non-limiting examples of functions include providing an audible, tactile (vibrating), and/or visual warning. For example, information of a notice signal indicating a collision course based on any one of position, velocity and acceleration of a vehicle with which a communication device disposed may be associated with a function prompting a warning alert. The warning alert may be any one of a tactile alert, audible alert, visual alert and combinations thereof that may be generated by the communication device receiving the notice signal.

In some example embodiments, controlling component 428 may access database 404 by way of access component 416. Controlling component 428 may therefore determine whether information of a notice signal has an associated function that should be performed.

Returning to FIG. 6, if a function is not to be performed (N at S612), then it continues to check for activation of the second communication mode (S604). For example, returning to FIG. 4, in the event that controlling component 428 determines that information of a receive notice signal has no associated function that should be performed, then no function is performed.

Returning to FIG. 6, if it is determined that a function is to be performed (Y at S612), then the function is performed (S614). For example, returning to FIG. 3B, consider that communication device 204 transmits a notice having information related to its current location and velocity associated with arrow 314. In this case, communication device 206 may determine that a collision is eminent. As shown in FIG. 4, controlling component 428 may determine, through an association stored in database 404, that the information related to the current location and direction of vehicle 102 (in which communication device 206 is disposed) corresponds to an imminent collision and therefore initiates a predetermined action to generate an alert.

Returning to FIG. 3B, communication device 206 provides an alert as shown by item 316. In an example embodiment, the alert includes an audible tactile and visual alert to warn the driver of vehicle 104. As a result, as shown in FIG. 3C, driver of vehicle 104 is able to change direction (or speed) as shown by arrow 316 thus avoiding a collision with vehicle 102.

Returning to FIG. 6, method 600 then it continues to check for activation of the second communication mode (S604).

If communication device 206 is not in a vehicle (N at S606), then it is determined whether a mode signal is received (S616), whether a subsequent notice is received (S618), whether a function is to be performed (S620), and if so, then the function is performed (S622). These portions of method 600 are similar to the previously discussed portions of method 600 (S608, S610, S612 and S614, respectively). The difference being that, in this portion of method 600 (S616, S618, S620 and S622) communication device 206 is not in a vehicle.

For example, if the communication device is not in a vehicle (N at S616), and a mode signal is receiver (Y at S616) then the communication device will be aware of nearby communication devices that are able to wirelessly communicate. This may occur, for example, if the person carrying the communication device is walking.

Further, if a subsequent notice signal is received (Y at S618), then the communication device will be aware of at least one nearby communication device is providing additional information. As such, returning to FIG. 4, any associations with which controlling component 428 accesses in database 404 are limited to those that do not deal with communication device 204 being in a vehicle.

For example, along this portion of method 600 (S616, S618, S620, S622), and applicable situation may deal with a user walking with communication device 206. For example, consider the situation where the user of communication device 204 is within a social network of the user of communication device 206. Further, let the user of communication device 206 be near the user carrying communication device 204. In accordance with this aspect of the present invention, communication device 206 may determine an association between the proximity of communication device 204 and providing an alert. As such, communication device 206 may ultimately perform a function (S622) alerting the user of communication device 206 that the user, who is within the social network of the user of communication device 206, is proximate to the location of the user of communication device 204.

In the example embodiment discussed above with reference to FIG. 6, communication device 206 is able to perform a function based on received signals from communication device 204. As mentioned previously, a similar method may be performed by communication device 204 based on received signals from communication device 204. Further, in the example embodiment discussed above with reference to FIG. 6, communication device 206 is able to perform a function based on received signals from a single communication device. It should be noted that in accordance with aspects or the present invention, communication device 206 may be able to perform a function based on received signals from any one of a plurality of communication devices.

The example embodiments discussed above are drawn to enabling a wireless communication device two wireless communication device communication mode. Once in this mode, the example embodiments discussed above are additionally drawn to determining, via a communication device, whether the communication device is within a vehicle using signals and other parameters associated with the vehicle. The example embodiments discussed above are additionally drawn to enabling a communication device or vehicle to receive: 1) communication mode signals from nearby wireless communication devices; and 2) a subsequent notice from these nearby wireless communication devices. Finally, the example binds discussed above are additionally drawn to enabling a communication device to autonomously perform a function based on the subsequent notices.

In essence, aspects of the present invention enable a smartphone to automatically and wirelessly communicate with nearby smartphones and two automatically perform functions based on these wireless communications.

In accordance with aspects of the present invention discussed above, the sensors and functionalities of smartphones can be used to supplement or even replace the known vehicle-based techniques of vehicle telematics. More specifically, smartphone-to-smartphone (when both phones are in Vehicle Mode), smartphone-to-infrastructure and infrastructure-to-smartphone communications (again, when the smartphone is in Vehicle Mode) can provide drivers with a wide range of telematics services and features, while resulting in little or no additional cost to the vehicle driver (depending on her smartphone contract) or the vehicle manufacturer (because it doesn't have to provide the purchaser of the vehicle with a smartphone and also doesn't have to embed costly vehicle telematics equipment in the vehicle). To be able to do so, however, the smartphone again has to be able to "know" that it is in Vehicle Mode and be able to determine in what vehicle it is. For various applications, it may be necessary to be able to determine if the smartphone is in the vehicle that is owned by the smartphone user. Aspects of the present invention enable a smartphone to know that it is in Vehicle Mode based on detected motion, magnetic, electric, magneto-electric signals and combinations thereof.

Further in accordance with the present invention, a smartphone may utilize its magnetometer function to periodically measure the electromagnetic levels sensed at the smartphone's current location. The smartphone uses its processing capabilities to try to map the periodic electromagnetic levels sensed by the smartphone with the vehicular electromagnetic signatures stored in library. If the periodic electromagnetic levels sensed by the smartphone match any of the specific vehicle signatures stored in the library, then the processor of the smartphone may generate and/or otherwise output a signal indicating that the smartphone is located in the specific vehicle, which in turn will be used by the Vehicle Mode detection method to trigger certain functions.

The Vehicle Mode, relevant sensor suite may be monitored at intervals depending on detected speed and location, for example, up to several times per second. The magneto metric sensor output may be monitored dependent on the accelerometer output as this will indicate a movement of the phone either within the vehicle environment or of the vehicle itself.

In the drawings and specification, there have been disclosed embodiments of the invention and, although specific terms are employed, they are used in a generic and descriptive sense only and not for purposes of limitation, the scope of the invention being set forth in the following claims.

What is claimed as new and desired to be protected by Letters Patent of the United States is:

1. A communication device comprising:
 a detecting component operable configured to detect at least one parameter relating to a field;
 a processing component operable configured to:
 autonomously determine whether the communication device is located within a vehicle by comparing a signature generated based on the detected at least one parameter with previously stored signatures associated with one or more vehicles,
 wherein the processing component operates in a vehicle mode when the communication device is located within a vehicle, and otherwise operates in a different mode;
 a transmitting component operable configured to transmit first vehicle mode signals to a second communication device when said processing component is operating in the vehicle mode, the first vehicle mode signals comprising:
 first indication signals specifying that the processing component is operating in the vehicle mode; and
 a first notice signal; and
 a receiving component operable configured to receive second vehicle mode signals from the second communication device, the second vehicle mode signals comprising:
 second indication signals specifying whether a processing component of the second communication device is operating in the vehicle mode; and
 a second notice signal comprising velocity information corresponding to a velocity of the second communication device,
 wherein said processing component is further operable configured to perform a function produce a warning signal while in the vehicle mode and based on the second vehicle mode signals received from the second communication device.

2. The communication device of claim 1, wherein the second notice signal includes location information corresponding to a location of the second communication device, and wherein said processing component is further operable to produce a warning signal, as the performance of the function, based on the location information.

3. The communication device of claim 1, further comprising a communication component operable configured to wirelessly communicate with a network.

4. A method comprising:
 detecting, via a detecting component of a communication device, at least one parameter relating to a field;
 autonomously determining, via a processing component of the communication device, whether the communication device is located within a vehicle by comparing a signature generated based on the detected at least one parameter with previously stored signatures associated with one or more vehicles;
 operating the processing component, that is operable configured to operate in a vehicle mode and in a different mode, in the vehicle mode when the communication device is located within a vehicle;
 transmitting, via a transmitting component of the communication device, first vehicle mode signals to a second communication device when said processing component is operating in the vehicle mode, the first vehicle mode signals comprising:
first indication signals specifying that the processing component is operating in the vehicle mode; and
a first notice signal;
receiving, via a receiving component of the communication device, second vehicle mode signals from the second communication device, the second vehicle mode signals comprising:
second indication signals specifying whether a processing component of the second communication device is operating in the vehicle mode; and
a second notice signal comprising velocity information corresponding to a velocity of the second communication device; and
performing producing, via the processing component, a function warning signal while in the vehicle mode and based on the second vehicle mode signals received from the second communication device.

5. The method of claim 4, further comprising: wherein the second notice signal comprises location information corresponding to a location of the second communication device, and
wherein said performing a function comprises producing a warning signal based on the location information.

6. The method of claim 4, further comprising wirelessly communicating, via a communication component of the communication device, with a network.

7. A non-transitory, tangible, computer-readable media having computer-readable instructions stored thereon, the computer-readable instructions being capable of being read by a communication device and being capable of instructing the communication device to perform the method comprising:
detecting, via a detecting component of the communication device, at least one parameter relating to a field;
autonomously determining, via a processing component of the communication device, whether the communication device is located within a vehicle by comparing a signature generated based on the detected at least one parameter with previously stored signatures associated with one or more vehicles,
operating the processing component, that is operable configured to operate in a vehicle mode and in a different mode, in the vehicle mode when the communication device is located within a vehicle;
transmitting, via a transmitting component of the communication device, first vehicle mode signals to a second communication device when said processing component is operating in the vehicle mode, the first vehicle mode signals comprising:
first indication signals specifying that the processing component is operating in the vehicle mode; and
a first notice signal;
receiving, via a receiving component of the communication device, second vehicle mode signals from the second communication device, the second vehicle mode signals comprising:
second indication signals specifying whether a processing component of the second communication device is operating in the vehicle mode; and
a second notice signal comprising velocity information corresponding to a velocity of the second communication device; and
performing producing, via the processing component, a function warning signal while in the vehicle mode and based on the second vehicle mode signals received from the second communication device.

8. The non-transitory, tangible, computer-readable media of claim 7, wherein the computer-readable instructions are capable of instructing the communication device to perform the method further comprising: wherein the second notice signal comprises location information corresponding to a location of the second communication device, and
wherein said performing a function comprises producing a warning signal based on the location information.

9. The non-transitory, tangible, computer-readable media of claim 7, wherein the computer-readable instructions are capable of instructing the communication device to perform the method further comprising wirelessly communicating, via a communication component of the communication device, with a network.

* * * * *